(12) United States Patent
Do Couto Fraga et al.

(10) Patent No.: US 12,234,411 B2
(45) Date of Patent: Feb. 25, 2025

(54) PROCESS FOR GENERATING RENEWABLE STREAMS FROM BIO-OIL AND USE THEREOF FOR THE PRODUCTION OF RENEWABLE FUELS

(71) Applicant: Petróleo Brasileiro S.A.—Petrobras, Rio de Janeiro (BR)

(72) Inventors: Adriano Do Couto Fraga, Rio de Janeiro (BR); Andrea De Rezende Pinho, Rio de Janeiro (BR); Luiza Torres Abrantes, Rio de Janeiro (BR); Jefferson Roberto Gomes, Rio de Janeiro (BR); Jose Luiz Zotin, Rio de Janeiro (BR); Iris Medeiros Junior, Rio de Janeiro (BR); Vitor Loureiro Ximenes, Rio de Janeiro (BR); Marlon Brando Bezerra de Almeida, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 189 days.

(21) Appl. No.: 17/786,960

(22) PCT Filed: Dec. 14, 2020

(86) PCT No.: PCT/BR2020/050542
§ 371 (c)(1),
(2) Date: Jun. 17, 2022

(87) PCT Pub. No.: WO2021/119783
PCT Pub. Date: Jun. 24, 2021

(65) Prior Publication Data
US 2023/0049916 A1    Feb. 16, 2023

(30) Foreign Application Priority Data
Dec. 17, 2019   (BR) .................. 10 2019 027016 0

(51) Int. Cl.
*C10G 1/06* (2006.01)
*C10G 3/00* (2006.01)

(52) U.S. Cl.
CPC ............. *C10G 1/06* (2013.01); *C10G 3/50* (2013.01); *C10G 2300/1014* (2013.01)

(58) Field of Classification Search
CPC ............. C10G 1/02; C10G 1/06; C10G 3/00; C10G 3/50; C10G 2300/10; C10G 2300/1011;
(Continued)

(56) References Cited

U.S. PATENT DOCUMENTS

| 8,003,834 B2 * | 8/2011 | Marker .................. C10G 45/02 585/242 |
| 2009/0253947 A1 * | 10/2009 | Brandvold ............. C10G 65/00 585/14 |
| 2019/0093021 A1 | 3/2019 | Brandvold et al. |

FOREIGN PATENT DOCUMENTS

BR   PI1001608 A2   1/2014
BR   112017023252 B1   12/2020
(Continued)

OTHER PUBLICATIONS

Christensen et al. (Oct. 6, 2011) "Analysis of Oxygenated Compounds in Hydrotreated Biomass Fast Pyrolysis Oil Distillate Fractions", Energy Fuels, 25(11):5462-5471.
(Continued)

*Primary Examiner* — Jonathan Miller
*Assistant Examiner* — Jason Y Chong
(74) *Attorney, Agent, or Firm* — Mintz, Levin, Cohn, Ferris, Glovsky and Popeo, P.C.

(57) ABSTRACT

The present invention relates to a process for the production of bio-oil-based renewable streams for composing a diesel or aviation kerosene (AVK) pool by combining the technologies of hydroprocessing esters and fatty acids (HEFA)
(Continued)

and thermochemical conversion of lignocellulosic biomass for generating bio-oil. The integration of conventional raw material from the HEFA pathway with a bio-oil fraction has the advantages of the use of a stream originating from the conversion of lignocellulosic material, which is widely available on the market, and also the production of a renewable stream containing aromatics in its composition.

5 Claims, 1 Drawing Sheet

(58) Field of Classification Search
CPC ........ C10G 2300/1014; C10G 2400/04; C10G 2400/08; Y02E 50/10; Y02P 30/20; C10L 1/02
See application file for complete search history.

(56) References Cited

FOREIGN PATENT DOCUMENTS

| FR | 3004722 A1 | 10/2014 |
|----|------------|---------|
| WO | 2016003892 A1 | 1/2016 |
| WO | 2017112717 A1 | 6/2017 |

OTHER PUBLICATIONS

Yuan et al. (Apr. 15, 2019) "Optimization of Hydrothermal Co-liquefaction of Seaweeds With Lignocellulosic Biomass: Merging 2" and 3' Generation Feedstocks for Enhanced Bio-oil Production", Energy, 173:413-422.

\* cited by examiner

PROCESS FOR GENERATING RENEWABLE STREAMS FROM BIO-OIL AND USE THEREOF FOR THE PRODUCTION OF RENEWABLE FUELS

CROSS-REFERENCE TO RELATED APPLICATIONS

This application is a national phase application, filed under 35 U.S.C. § 371, of PCT International Patent Application No. PCT/BR2020/050542, filed Dec. 14, 2020, and claims benefit of and priority to Brazilian application BR 10 2019 027016 0, filed on Dec. 17, 2019, the disclosures of all of which are incorporated herein by reference in their entirety.

FIELD OF THE INVENTION

The present invention relates to a process for the production of renewable stream, from bio-oil, which, after processing in a refining unit, generates products with a suitable composition for the formulation of fuels with renewable content.

The new renewable filler is produced by integrating a fatty stream with a fraction of a bio-oil, generated through fast pyrolysis, catalytic pyrolysis, hydrothermal liquefaction or other thermochemical biomass conversion processes.

There are several possibilities of inserting renewable streams in refining, where hydroconversion, catalytic cracking and delayed coking units stand out, among others.

One of the most prominent possibilities is the hydroconversion routes. As example can be mentioned the HEFA route (hydroprocessing of esters and fatty acids) for the production of renewable diesel and aviation biokerosene.

The integration of the conventional raw material of the HEFA route with a fraction of the bio-oil has the advantages of using a stream from the conversion of lignocellulosic material in addition to the production of a renewable stream containing aromatic compounds in its composition, which is a differential in relation to the traditional HEFA route, which produces only paraffinic compounds.

STATE OF THE ART DESCRIPTION

Currently, the aviation sector is responsible for the emission of more than 700 Mton of $CO_2$ into the atmosphere. Due to environmental issues, the sector has set a goal of reducing these emissions by at least 50% by 2050, with the development of aviation biofuels playing a crucial role in achieving this goal (IATA, 2014).

Although Brazil stands out for the production and use of ethanol and biodiesel, they do not have suitable properties for use as aviation fuel. An ideal biofuel should have a chemical composition similar to that of traditional kerosene, in order to meet the drop-in concept. Currently, oxygen-free paraffinic mixtures have been obtained from biomass, and more than 200 commercial flights were operated with alternative fuels in 2014.

The routes for obtaining fuels from biomass that are in more advanced stages are those that employ the Fischer-Tropsch (FT) process, the hydroprocessing of esters and fatty acids (HEFA), the fermentation of sugars to hydrocarbons (SIP—synthetic iso-paraffins) and the oligomerization of alkenes generated from the dehydration of alcohols (ATJ—alcohol-to-jet) (IATA, 2014).

The HEFA route consists of the hydroprocessing of esters and fatty acids, from vegetable, animal or algae-derived oils and fats, in the presence of heterogeneous catalysts. In this process occurs the hydrogenation of the unsaturations, the separation of the fatty chains from the acylglycerides molecules and the deoxygenation of the chains.

The hydroconversion of fatty acids and esters (HEFA) technology already exists on a commercial scale, with a large number of units in operation, supplying the stream demand for renewable diesel and aviation biokerosene worldwide.

In addition, the HEFA route has the highest technological maturity (TRL) among all those approved by the ASTM (American Society for Testing and Materials), and also allows the production of aviation biokerosene economically in certain carbon taxation scenarios.

Despite the various advantages of the HEFA route, the raw materials used as filler are oils and fats, that is, they are greasy raw materials that can be of residual origin or not, which makes the technology vulnerable to sustainability criteria, since there is not a great availability of raw materials considered residual (e.g., animal fats and sewage fats).

The lack of availability on a large scale also affects the potential for market gain, since, in this way, limitations are imposed for the expansion of technology, which also tends to increase the cost of production.

Another challenge to be overcome by fuels from biomass, processed by HEFA routes, is the quality standards required for aviation kerosene. According to ASTM 7566 specification, the blend of fossil kerosene with biokerosene must contain at least 8% aromatics. However, biofuels produced by the HEFA route are paraffinic and therefore do not have aromatic compounds.

It is known that the quality of aviation kerosene is specified by the properties of calorific value, specific mass, soot point and aromatic content. The calorific value and the specific mass determine the flight autonomy, while the soot point and the aromatic content allow the generation of a flame that does not cause significant formation of soot and deposits, preserving the useful life of the combustion chamber. However, the state of the art fails to propose a fuel, obtainable from abundant and renewable raw material, which presents compatible quality for use as aviation kerosene.

Regarding the processing of biofuels, it is valid to mention some processes described in the state of the art, such as the document BR 112018013031-1 which describes a process for obtaining fuel for transport. The aforementioned process relates to partially deoxygenated fuels from pyrolysis oil derived from biomass, in which said oil is heated with a recycle stream and subsequently subjected to the presence of hydrogen in a catalyst. The effluent (compound from the hydrogenation reaction) is separated with a gaseous fuel stream and a combustible product stream. However, the mentioned document does not propose a way to extract the molecules of greatest interest present in the bio-oil using the potential filler of HEFA units (fat filler) as a solvent. Thus, the invention described in patent BR 112018013031-1 relates to the direct hydrogenation of bio-oil, which has economic disadvantages related to the quality of the bio-oil (high water content, acidity and carbon residue) that lead to a reduction in the campaign of the hydrogenation units and the need to increase the severity of the process conditions, with an impact on the engineering of the reactors. Therefore, the present invention brings advances in being able to insert the molecules of greatest interest present in the bio-oil, rejecting, however, the negative characteristics of this material as mentioned above (high water content, acidity and carbon residue). Also in a complementary way, the selective extraction of the molecules of interest from the bio-oil with a fatty filler allows the generation of aromatic compounds necessary for the final formulation of the AVK.

Document WO 2017/112717 relates to a method for producing liquid fuel, in particular aviation kerosene. In this document, the use of cycloparaffins in the production of aviation kerosene is described. Several possible routes for obtaining cycloparaffins are reported, including routes that use lignocellulosic biomass to generate products via pyrolysis. Next, a process of hydrogenation and condensation of the cycloparaffin obtained with another stream containing oxygenated products is described. The product obtained is used in the formulation of kerosene.

Still with regard to the document WO 2017/112717, it should be noted that the aforementioned document does not propose a way to extract the molecules of greatest interest present in bio-oil using the potential filler of HEFA units (fat filler) as a solvent. Furthermore, it is not proposed to use renewable stream as a filler for HEFA units. In this way the invention described in patent WO 2017/112717 presents a method for obtaining a renewable stream that is later converted through the use of a special catalytic and reactional system that requires additional investments for its generation. In the present invention the generated renewable stream can be processed in existing units of HEFA technology without the need for investments.

Document WO 2016003892 relates to processes for thermally transforming biomass, including lignocellulosic materials, which after pyrolysis or hydropyrolysis is sent to a hydroprocessing reactor. However, the mentioned document does not propose a way to extract the molecules of greatest interest present in the bio-oil using the potential filler of HEFA units (fat filler) as a solvent. Thus, the invention described in the patent WO 2016003892 relates to the direct hydrogenation of bio-oil, which has economic disadvantages related to the quality of the bio-oil (high water content, acidity and carbon residue) that lead to a reduction in campaign time of the hydrogenation units and the need to increase the severity of the process conditions, with an impact on the engineering of the reactors. Therefore, the present invention brings advances in being able to insert the molecules of greatest interest present in the bio-oil, rejecting, however, the negative characteristics of this material as mentioned above (high water content, acidity and carbon residue). Also in a complementary way, the selective extraction of the molecules of interest from the bio-oil with a fatty filler allows the generation of aromatic compounds necessary for the final formulation of the AVK.

Document BR PI 10011608 discloses a process for obtaining aviation biokerosene. Thus, the aforementioned document succeeds in producing aviation biokerosene from vegetable oil. However, it fails to propose a route to incorporate compounds derived from the conversion of lignocellulosic biomass, since this is an invention strictly related to the use of fatty materials as raw materials.

The article "Techno-economics and resource analysis of hydroprocessed renewable jet fuel" describes an aviation fuel derived from biomass, in which the process of obtaining it takes place through the HEFA method—hydroprocessing of esters and fatty acids. However, the mentioned document does not propose a way to extract the molecules of interest present in bio-oil using the potential filler of HEFA units (fat filler) as a solvent. Therefore, the present invention brings advances in being able to insert the molecules of greatest interest present in bio-oil, rejecting, however, the negative characteristics of this material (high water content, acidity and carbon residue). Also in a complementary way, the selective extraction of the molecules of interest from the bio-oil with a fatty filler allows the generation of aromatic compounds necessary for the final formulation of the AVK.

Document BR 112017023252-9 combines hydropyrolysis with hydroprocessing steps for the production of fuels from lignocellulosic biomass. Therefore, it does not propose a way to extract the molecules of greatest interest present in the bio-oil using the potential filler of HEFA units (fat filler) as a solvent. Thus, the invention described in patent BR 112017023252-9 relates to the direct hydrogenation of bio-oil obtained by hydropyrolysis using the gaseous stream generated in the process. This approach has economic disadvantages related to the quality of the bio-oil (high water content, acidity and carbon residue) that lead to a need for high severity, with an impact on reactor engineering. Therefore, the present invention brings advances in being able to insert the molecules of greatest interest present in the bio-oil, rejecting, however, the negative characteristics of this material as mentioned above (high water content, acidity and carbon residue). Also in a complementary way, the selective extraction of the molecules of interest from the bio-oil with a fatty filler allows the generation of aromatic compounds necessary for the final formulation of the AVK.

In order to solve the problems exposed in the state of the art, the present invention was developed, which proposes the production of a new filler for the HEFA routes, integrating a fatty stream with a fraction of a bio-oil generated through a thermochemical technology of biomass conversion, such as fast pyrolysis, and its subsequent processing via hydroconversion, as occurs in the HEFA route, for production of renewable diesel or aviation biokerosene.

Thus, the aforementioned process allows the generation of fillers for the HEFA units, or other refining units, from raw materials of lignocellulosic origin, increasing sustainability, the potential for market gain and the economy of production routes of renewable fuels integrated into refining.

In this context, the present invention proposes the production of renewable fuels from abundant raw materials such as lignocellulosic biomass, such as sugarcane straw and bagasse.

The present invention is applicable to units that produce aviation biokerosene or renewable diesel through oil and fat hydroconversion technologies and which aim to insert aromatic compounds into the final product; increase the sustainability of the route, inserting a fraction of a stream from the thermochemical conversion of lignoellulosic material together with the traditional raw material (such as a fraction of the bio-oil from rapid pyrolysis, catalytic pyrolysis or hydrothermal liquefaction) and increase the potential market gain of the route, due to the great availability of lignocellulosic raw materials.

BRIEF DESCRIPTION OF THE INVENTION

The present invention relates to a process for integrating the HEFA technology, already existing on a commercial scale, with the technologies for generating oils from lignocellulosic biomass (bio-oil).

Nevertheless, the renewable filler generated by the fatty stream and the fraction obtained selectively from the bio-oil can be used as a filler in other refining processes, in a dedicated way or in co-processing, such as catalytic cracking, delayed coking and hydroconversion.

Lignocellulosic raw material, from forestry or agricultural residues, such as sugarcane straw and bagasse, generates bio-oil from thermochemical biomass conversion processes, such as pyrolysis and liquefaction.

The integration between the conventional filler from the HEFA process with the filler from lignocellulosic biomass can be conducted through the liquid-liquid extraction process. The extraction allows the generation of fillers for the HEFA units containing molecules of lignocellulosic origin, increasing the sustainability, the potential for market gain and the economy of the production route of renewable fuels.

The extraction of bio-oil components is performed by the fatty stream. After the extraction process, two streams are formed: raffinate and extract. The raffinate is the residue of the bio-oil remaining after the extraction and the extract is composed of the fatty stream and the compounds extracted from the bio-oil. The extraction may have one or more stages in order to increase the concentration of compounds from the bio-oil in the extract phase.

After separating the phases, the extract is then sent to the hydrogenation reactor where a gaseous stream rich in $CO_2$ and a liquid stream of hydrogenated product are produced that can be used in the composition of the fuel pool of the Otto, Diesel and Brayton (gasoline, diesel and aviation kerosene, respectively).

In addition, the product generated by the present invention provides a fuel with lower carbon emissions into the atmosphere and a content of 8 to 11% v/v of renewable aromatics, that is, with desirable characteristics for the formulation of aviation kerosene with renewable content.

Thus, the objective of the present invention is to develop a process capable of transforming oils of renewable origin into a product that can be incorporated into bioAVK or other fuels with renewable content.

DESCRIPTION OF DRAWINGS

The invention can be better understood through the following detailed description, in line with the attached figures.

FIG. 2 shows that the amount of compounds extracted varies according to the extraction conditions used, with temperature being the variable with the greatest influence.

DETAILED DESCRIPTION OF THE INVENTION

Figure 1:
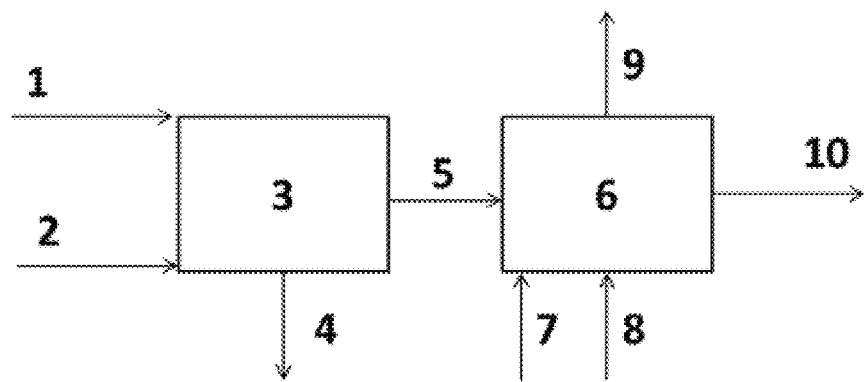
FIG. 1 schematically represents the proposed process, in which the first equipment (3) is where the extraction of the bio-oil components (1) by the fatty acid (2) occurs. The extraction may have one or more stages in order to increase the concentration of compounds from the bio-oil in the extract phase. After the extraction process, raffinate (4) and extract (5) streams are formed. Raffinate is the bio-oil residue remaining after extraction and the extract is composed of fatty acid and substances extracted from bio-oil. The extract phase (5) then proceeds to the hydrogenation reactor (6). In the hydrogenation reactor, catalyst (7) and hydrogen (8) are also charged. After the hydrogenation step, a gas stream (9) rich in $CO_2$ and a liquid stream of hydrogenated product (10) are obtained that can be used in the composition of the fuel pool of the Otto, Diesel and Brayton cycle (gasoline, diesel and aviation kerosene, respectively).
Figure 2:
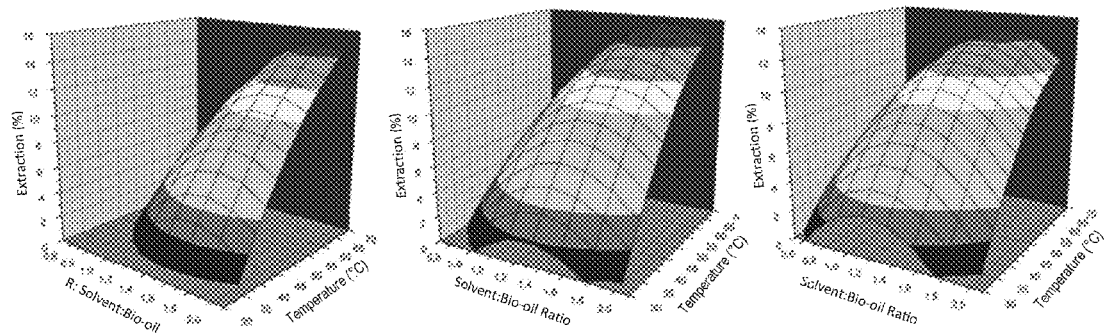
FIG. 2 is a graphic representation of the influence of the main process variables on the amount of bio-oil components extracted by the fatty acid (oleic acid), for residence times of 0 h, 3 h and 6 h.

As mentioned above, the present invention relates to a process for integrating the HEFA technology, already existing on a commercial scale, with the technologies for generating oils from lignocellulosic biomass (bio-oil). Bio-oil is generated from processes of rapid pyrolysis of biomass or any other process known in the state of the art.

The mentioned bio-oil is subjected to an extraction process with a fatty stream, at temperatures in the range of 30 to 100° C., residence times from 0 to 12 h and fatty stream:bio-oil ratios between 0.1 and 5 (w/w).

To perform the extraction, a known mass of bio-oil is inserted into the reactor, followed by an addition of fatty stream in order to meet the determined mass ratio of fatty stream:bio-oil. The mixture is heated to the desired extraction temperature. After the extraction temperature is reached, the counting of the residence time begins.

The extract phase is located in the upper section of the reactor and is mostly composed of the fatty stream and the compounds extracted from the bio-oil. In the lower phase, known as raffinate, the remaining products of the bio-oil are concentrated.

Optionally, the extract phase, rich in fatty compounds, can be used again in another extraction, replacing the pure fatty compounds, aiming to increase the concentration of compounds from the bio-oil in the extract phase.

The renewable extract obtained in the previous step (extraction) can be hydrogenated under process conditions and catalytic systems typically used in the HEFA route to convert pure fatty fillers. At this stage of the process, deoxygenation, decarboxylation and decarbonylation reactions occur, with a significant reduction in acidity.

The final product has a content of renewable aromatic compounds that can be adjusted depending on the conditions and number of extraction steps.

Thus, in a first embodiment, the present invention relates to a process for the production of a renewable product, with adequate quality for incorporation into the pool of renewable diesel or aviation biokerosene, which comprises the steps: (a) extraction of the bio-oil and (b) conversion of the extract via refining processing, such as a hydrogenation process.

The present invention also describes a process for obtaining a renewable product containing paraffins and aromatics from two different fillers (bio-oil and fatty stream). It should be noted that the bio-oil comes from lignocellulosic biomass conversion processes such as pyrolysis or liquefaction or even mixtures of bio-oils obtained by these routes. The biomass used can be, among others, sugarcane straw and bagasse.

In a second embodiment, the present invention considers a renewable diesel or bio-AVK formulation that comprises the use of a stream obtained by the conversion of fatty compounds and compounds extracted from bio-oil, according to the process described above.

A relevant aspect of the second embodiment relates to the fact that the formulation based on the obtained renewable stream provides the presence of aromatics of renewable origin in an adjustable percentage according to the process conditions employed.

The invention will be better understood by briefly describing its examples.

EXAMPLES

Example 01

A set of experiments was carried out in ranges of interest of the process variables so that the influences of the main variables on the content of products extracted by oleic acid were known. The evaluation carried out showed that the amount of compounds extracted varies according to the extraction conditions used.

Temperatures in the range of 30 to 70° C., residence times of 0 to 6 h and oleic acid:bio-oil ratios between 0.5 to 2 (w/w) were evaluated.

From the data generated in the experimental design, an empirical predictive model of the percentage of extraction was obtained, using multivariable polynomial regression. The generated model showed a good fit to the experimental data, thus being considered a tool for selection of process conditions to adjust the content of compounds extracted from the bio-oil.

Temperature proved to be the variable with the greatest influence on the content of extracted compounds. Higher temperatures present higher contents of extracted compounds for all times and fatty acid:bio-oil ratios evaluated. On the other hand, the time and the fatty acid:bio-oil ratio showed intermediate maximum points and an interaction effect between the variables.

Thus, example 01 showed that oleic acid is effective in extracting molecules that compose the bio-oil.

Example 02

Double, sequential extraction was performed using oleic acid and bio-oil in the first extraction. The extract from the first extraction replaced the oleic acid in the second extraction. The experiment data can be found in the table below. It is observed that the % extracted is reduced from the first (9.2%) to the second extraction stage (5.7%), indicating that the extract was already partially saturated (that is, close to the solubilization limit) by molecules that could be extracted from bio-oil. In addition, the extraction mechanism can be influenced by the amount of free oleic acid molecules for the solvation of compounds from bio-oil, since extract 1 already contained oleic acid molecules solvating molecules from bio-oil.

TABLE 1

Conditions of the double extraction experiment

| Conditions | $1^{st}$ extraction | $2^{nd}$ extraction |
|---|---|---|
| Temperature | 50° C. | 50° C. |
| Time | 3 h | 3 h |
| Fatty stream (or extract 1):bio-oil ratio | 1 | 1 |
| % extracted | 9.2% | 5.7% |

Despite the relative reduction in the percentage of bio-oil extracted, the process with two consecutive extraction steps proved to be effective in increasing the concentration of bio-oil compounds in the extract. Table 2 shows the main characteristics of raw materials and extracts.

TABLE 2

Characteristics of extracts after $1^{st}$ and $2^{nd}$ extractions

| Analysis | Bio-oil | Oleic acid | $1^{st}$ extraction | $2^{nd}$ extraction |
|---|---|---|---|---|
| Oxygen content | 47.2 | 11.3 | 13.6 | 14.3 |
| Acidity (mg KOH/g) | 75 | 203 | 199 | 184 |
| Water content (%) | 25.0 | 0.1% | 0.9 | 1.1 |
| Density (g/ml) | 1.2261 | 0.8950 | 0.9116 | 0.9208 |
| Viscosity cP at 20° C. | 190.2 | 25.6 | 33.5 | 38.2 |

The results indicate that the extraction method was effective in drastically reducing the water content in the extracts. The high water content of bio-oil is one of the main difficulties for its processing in refining, so the effectiveness of the process in reducing this concentration is of great value. In addition, it is also observed from oleic acid an increase in the oxygen content in the extracts, characteristic of the incorporation of oxygenated molecules from the bio-oil to the extract.

The acidity of the extracts is reduced because the acidity of the bio-oil molecules that are being incorporated into the extract is lower than that observed for oleic acid, thus causing the reduction.

The technique of gas chromatography coupled with mass spectrometry was used to identify the main compounds, from the bio-oil, present in the extracts. Table 3 summarizes the results obtained. The same compounds were observed for the two extracts analyzed. The results obtained are in agreement with expectations, with a greater number of compounds of the ketone and phenol classes, typically formed in thermal decomposition processes of the cellulosic and lignin fractions, respectively.

TABLE 3

Class of compounds present in bio-oil extracts

| Class | Compounds |
|---|---|
| Ketones | 2-pentanone |
| | 1-hydroxi-2-propanone |
| | 4-hydroxi-4-methyl-2-pentanone |
| | 4-hydroxi-2-pentanone |
| | 4-methyl-3-penten-2-one |
| | Cyclopentanone |
| | Methylcyclopentnolone |
| | 3-ethyl-2-cyclopenten-1-one |
| | 2-cyclopenten-1one |
| | Hydroxi-2-butanone |
| | 2-methyl-2-cyclopenten-1one |
| | 3-methyl-2H-furan-5-one |
| | Acetylfurane |
| | 3-ethyl-2-hydroxi-2-cyclopenten-1-one |
| Aldehydes | Hydroxiacetaldehyde |
| | propanal |
| | Furfural |
| Carboxylic acids | Acetic acid |
| | Propanoic acid |
| Hydrocarbons | 1-ethyl-3-methyl benzene |
| | Trimethyl benzene |
| | Xylene |
| | Toluene |
| | Limonene |
| Phenolics | Phenol |
| | Methoxyphenol |
| | Trimethylphenol |
| | Creosol |
| | 4-propenilguaiacol |
| | Methylphenol |
| | Ethyl-methyl-phenol |
| | Ethylphenol |
| | Xylenol |
| | 4-ethyl-2-methoxyphenol |

TABLE 3-continued

Class of compounds present in bio-oil extracts

| Class | Compounds |
|---|---|
| | Eugenol |
| | Vaniline |
| | Apocinine |

The results of gas chromatography coupled to mass spectrometry confirmed that the molecules typically present in bio-oil were extracted by oleic acid. In addition, the hypothesis of obtaining a filler containing fatty acids was confirmed, as well as compounds containing aromatic rings of renewable origin, derived from bio-oil, and which may be of interest for the production of streams for the composition of aviation kerosene pools (AVK).

Example 03

The extract obtained in example 2 (after second extraction) underwent a catalytic hydrogenation process aiming at:
1—obtaining paraffins from the hydrogenation/decarboxylation/decarbonylation of the fatty acids present;
2—reducing the global oxygen content;
3—converting phenolic compounds from bio-oil to hydrocarbons containing aromatic rings.

To this end, the tests were performed according to the hydrogenation procedure described below.

The renewable extract was diluted 1:1 m/m with linear paraffin mixture (C14-C18). NiMo-type catalyst (3 g for 80 ml of renewable extract) was used. Dimethyl-disulfide was used as a sulfating agent in the ratio of 2 ml to 3 g of catalyst. The mixture of paraffins and renewable extract, catalyst and sulfating agent was simultaneously charged into the reactor.

An autoclave reactor with mechanical stirring and temperature control was used. After closing the reactor and performing a procedure to check for tightness, the reactor was pressurized with 30 bar of $H_2$. Heating was started with the magnetic stirring off. When the temperature reached the value of 360° C., the agitation was then activated for 660 rpm. The reactor was maintained at the desired temperature during the planned residence time (4 h). After this period, the heating was turned off and the insulation removed for rapid cooling. With the reactor cooled, a sample of the gaseous fraction was collected for analysis, and the reactor was depressurized and opened. The reaction medium was filtered to separate the catalyst and the liquid product sent for analysis.

The characteristics of the renewable extract used and the product obtained after hydrogenation can be seen in Table 4.

TABLE 4

Characteristics of the extract after the
2$^{nd}$ extraction and of the hydrogenation product

| Analysis | 2$^{nd}$ extraction | Hydrogenation product |
|---|---|---|
| Oxygen content (%) | 14.3 | 2.8 |
| Acidity (mg KOH/g) | 184 | 26 |
| Water content (%) | 1.1 | 0.18 |

A high reduction in acidity is observed. From these data, a conversion of acids of the order of 85.9% is estimated. Oxygen removal reached 80.4%. Both conversion data indicate that the objective of promoting deoxygenation reactions of the renewable extract was achieved by the proposed process. Additionally, the analysis of the gaseous fraction indicated a high percentage of $CO_2$ and $CH_4$, in addition to hydrogen present in the filler. With these data, the hydrogen consumption during the reaction was estimated at 74%. The formation of $CO_2$ is typically derived from fatty acid decarboxylation reactions, while the formation of methane can be derived from the hydrogenation of carbon monoxide, arising from the decarbonylation of ketones present in the renewable extract. Gas chromatography with coupled mass spectrometry was used to determine the chemical composition of the reaction product, as shown in Table 5.

TABLE 5

Class of compounds present in the hydrogenated product

| Class | Compounds |
|---|---|
| Ketones | 4-hydroxi-2-pentanone |
| | 1-(2,4-dimethyl)-ethanone |
| Hydrocarbons | Ethyl benzene |
| | Trimethyl benzene |
| | Xylene |
| | Toluene |
| | 4-isopropyltoluene |
| | Indan |
| | Methyl ethyl benzene |
| | Methyl indan |
| | 1-methyl-4(1-methylpropyl)-benzene |
| | Dimethyl ethyl benzene |
| | Alkylated aromatics |
| | n-paraffins C8-C18 |
| | naphthalene |
| | 2-isopropyl-10-methylfenantrene |
| Phenolics | Ethyl methyl phenol |
| | Dimethyl phenol |
| | Ethyl phenol |
| | Propyl phenol |
| | 2-methyl phenol |

From the data in Table 5, an extensive reduction in the compounds of the ketone and phenolic classes is observed. In fact, only two ketones were detected. Among the phenols, there is a complete conversion of methoxy groups, classically derived from the conversion of lignin, in addition to a considerable reduction in the number of compounds detected.

On the other hand, a large number of hydrocarbons were observed, especially C8-C18 paraffins arising from the hydrogenation and cracking of oleic acid, in addition to a great diversity of alkylated aromatics, arising from the conversion of phenols and methoxy-phenols present in the renewable extract. It is worth mentioning that the presence of fatty acids was not observed, indicating, therefore, a 100% conversion of these acids into paraffins and other products. The results obtained are in agreement with the other characterizations of the product, which indicated wide deoxygenation, with a high reduction in acidity and extensive occurrence of decarboxylation and decarbonylation reactions.

In order to quantify the content of aromatics generated in the product of the process in question, the technique of liquid chromatography in supercritical fluid was used. Table 6 shows the presence of mono, di and tri-aromatics, which together exceed 11%.

TABLE 6

Classes of aromatic compounds in the hydrogenated product

| Compound class | % |
|---|---|
| Saturated | 88.5 |
| Monoaromatics | 7.4 |
| Diaromatics | 3.3 |
| Triaromatics | 0.7 |
| Polyaromatics | <0.5 (0.0) |

Thus, it is possible to conclude that the process proposed in the present invention was able to generate a renewable product containing paraffins and aromatics from two different fillers (bio-oil and fatty acids). Such a product can be used after fractionation for the composition of the fuel pool of the Otto, Diesel and Brayton cycles, bringing a renewable characteristic to these fuels and, therefore, reducing their carbon footprint. More specifically in relation to Brayton cycle fuels, the important combination obtained with the concomitant presence of paraffins and aromatics of renewable origin stands out.

The invention claimed is:

1. A process for generating a renewable stream, the process comprising:
    (a) extracting oxygenated molecules from a bio-oil derived from a lignocellulosic biomass using a fatty acid stream as a solvent at a temperature in a range of 30 to 100° C., a residence time from 0 to 10 h and a fatty acid stream: bio-oil ratio between 0.1 and 5 (w/w);
    (b) separating an extract phase and a raffinate phase, where the extract phase contains fatty compounds and the oxygenated molecules extracted from the bio-oil; and
    (c) hydrogenating the extract phase under conditions effective to hydroprocess esters and fatty acids to produce a renewable fuel product.

2. The process according to claim 1, characterized in that the separation of extract and raffinate phases occurs due to density differences.

3. The process according to claim 1, characterized in that extraction comprises two stages, wherein the fatty acid stream is used as a first solvent in a first stage to obtain an intermediate extract phase, wherein the intermediate extract phase is used as a second solvent in a second stage to obtain the extract phase, and wherein the extract phase contains an increased concentration of compounds extracted from the bio-oil relative to the intermediate extract phase.

4. The process according to claim 1, characterized in that the bio-oil used in the extraction is obtained via thermochemical conversion processes of lignocellulosic biomass.

5. The process according to claim 1, characterized in that in the hydrogenation step two streams are generated: a gaseous stream comprising $CO_2$, and an organic liquid stream composed of the renewable fuel product that can be used in the composition of the pool of Otto, Diesel and Brayton cycle fuels.

* * * * *